(12) United States Patent
Maruyama

(10) Patent No.: US 10,298,022 B2
(45) Date of Patent: May 21, 2019

(54) POWER SUPPLY CONTROL SYSTEM

(71) Applicant: YAZAKI CORPORATION, Tokyo (JP)

(72) Inventor: Akinori Maruyama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 488 days.

(21) Appl. No.: 15/145,859

(22) Filed: May 4, 2016

(65) Prior Publication Data

US 2016/0248262 A1 Aug. 25, 2016

Related U.S. Application Data

(63) Continuation of application No. PCT/JP2014/079532, filed on Nov. 7, 2014.

(30) Foreign Application Priority Data

Nov. 12, 2013 (JP) .................................. 2013-233930

(51) Int. Cl.
G06F 17/00 (2006.01)
H02J 7/00 (2006.01)
(Continued)

(52) U.S. Cl.
CPC .............. *H02J 4/00* (2013.01); *B60R 16/03* (2013.01); *G06F 1/28* (2013.01); *G06F 1/3206* (2013.01); *H02J 1/108* (2013.01)

(58) Field of Classification Search
CPC .. H02J 4/00; H02J 1/108; B60R 16/03; G06F 1/28; G06F 1/3206
(Continued)

(56) References Cited

U.S. PATENT DOCUMENTS 9,105,078 B2 * 8/2015 Lim ......................... G06T 5/001
9,252,602 B2 * 2/2016 Ohkawa ................. H02J 7/0016
(Continued)

FOREIGN PATENT DOCUMENTS

CN 1872592 A 12/2006
CN 101441251 A 5/2009
(Continued)

OTHER PUBLICATIONS

Chinese Official Action dated Apr. 1, 2017 in the counterpart Chinese patent application.
(Continued)

Primary Examiner — Brandon S Cole
(74) Attorney, Agent, or Firm — MetroLexis Law Group, PLLC

(57) ABSTRACT

A power supply control system includes: a current sensor as a first detector detecting current flowing in each controller in an operating state of each controller; a first current controller turned on to supply a driving current to each controller in the operating state of each controller and turned off to disconnect the driving current supply to each controller based on a determination result; a second current controller turned on to supply a dark current to each controller in a power-saving state of each controller and turned off to disconnect the dark current supply to each controller in the operation state of each controller; a dark current sensor as a second detector detecting a voltage drop amount in the power-saving state of each controller; and an anomaly determinator determining existence of anomaly in the power-saving state of each controller based on a detection result obtained from the second detector.

3 Claims, 5 Drawing Sheets

(51) Int. Cl.
*G01N 21/49* (2006.01)
*H02J 4/00* (2006.01)
*B60R 16/03* (2006.01)
*G06F 1/28* (2006.01)
*G06F 1/3206* (2019.01)
*H02J 1/10* (2006.01)

(58) Field of Classification Search
USPC .................................................. 307/43–87
See application file for complete search history.

(56) References Cited

U.S. PATENT DOCUMENTS

| | | | |
|---|---|---|---|
| 9,265,476 B2* | 2/2016 | Iwakiri | A61B 6/4233 |
| 2006/0276947 A1* | 12/2006 | Kaita | H01H 47/002 |
| | | | 701/48 |
| 2009/0132188 A1* | 5/2009 | Watanabe | G01R 31/2829 |
| | | | 702/64 |
| 2012/0288409 A1* | 11/2012 | Inabe | G01N 21/51 |
| | | | 422/82.05 |
| 2013/0329278 A1* | 12/2013 | Muro | H01S 3/302 |
| | | | 359/334 |
| 2016/0219234 A1* | 7/2016 | Nishihara | H04N 5/378 |
| 2016/0248262 A1* | 8/2016 | Maruyama | B60R 16/03 |
| 2017/0106820 A1* | 4/2017 | Maruyama | B60R 16/03 |

FOREIGN PATENT DOCUMENTS

| | | |
|---|---|---|
| JP | 2000-236621 A | 8/2000 |
| JP | 2005-328632 A | 11/2005 |
| JP | 2007-125934 A | 5/2007 |
| JP | 2007-203929 A | 8/2007 |
| JP | 2009-081948 A | 4/2009 |

OTHER PUBLICATIONS

Japanese Office action dated Jun. 13, 2017 in the counterpart Japanese patent application.

* cited by examiner

POWER SUPPLY CONTROL SYSTEM

CROSS REFERENCE TO RELATED APPLICATIONS

This application is a continuation of International Application No. PCT/JP2014/079532, filed Nov. 7, 2014, and based upon and claims the benefit of priority from Japanese Patent Application No. 2013-233930, filed Nov. 12, 2013, the entire contents of all of which are incorporated herein by reference.

TECHNICAL FIELD

The present application relates to a power supply control system, and in particular relates to a power supply control system configured to control supplying and blocking power to a load by monitoring a dark current.

BACKGROUND

In recent years, the number of electronic devices (i.e., electronicses) mounted on a vehicle or the like is in an increasing trend, and the number of mounted electronic control units (ECUs) as a controller for controlling the electronic devices is also increasing. Thus, a probability that an operational failure occurs in any one of the ECUs is also in an increasing trend.

In particular, when a vehicle system mounted on a vehicle is turned off (that is, when an ignition switch is brought into an off-state), in a case that any one of the ECUs could not transition to a power-saving state (also called a sleep state or the like) due to some defects, a dark current is increased. By this increased dark current, there is a possibility that electric power of an on-vehicle battery is consumed or deterioration of the battery itself is caused, and consequently, there is a possibility that the vehicle may become unable to start.

Also, the "dark current" is for example current that flows in various circuits in a vehicle in a state that an ignition switch is turned off, and it includes a standby current of a microcomputer that constitutes an ECU and the current consumed by a clock, a security system or the like. The dark current in a vehicle is 50 mA or less in general, but in a vehicle that mounts more electric components or the like, there are also ones that consume a larger dark current.

Thus, a conventional example is proposed with respect to a power supply control system that monitors current consumption of each ECU and restrains a dark current by disconnecting the power supply based on the monitoring result or the like (such as JP 2009-081948 A (PTL 1)).

In the conventional power supply control system described in PTL 1, each controller (ECU) self-reports its current value state, and a monitoring device calculates a threshold value based on their total value, and when the threshold value is exceeded, the power supply is disconnected.

More specifically, in a power supply control system 600 of the conventional example, as illustrated in FIG. 5, a plurality of controllers 501A, 501B, and 501C connected to the same power supply line 500 self-report their operation states or allotment threshold current values that conform to their operation states that each grasps to a monitoring device 501E via a communication line 530 as calculation information of a disconnection threshold current value. The monitoring device 501E receives the report, sets the allotment threshold current values for respective controllers 501A, 501B, and 501C, dynamically updates and sets the disconnection threshold current value by using calculated values of these allotment threshold power supply current, and when a power supply output current value exceeds the disconnection threshold current value, a power supply switch 510 on the power supply line 500 is brought into a disconnected state.

SUMMARY

In the power supply control system 600 of the conventional example, a plurality of controllers (ECUs) self-report the threshold value settings by communication, and while it has an advantage of high accuracy of the threshold value, it is necessary that all ECUs are connected to communication. Therefore, power supply control cannot be performed for ECUs or the like that do not have a communication function.

Moreover, in the power supply control system 600 of the conventional example, since an occurrence of anomaly can only be determined by the total current that the current of each ECU is added up, depending on the combination of operation states of electronic devices or the like controlled by the respective ECUs, there may be a case that anomaly cannot be detected.

Furthermore, since the detection circuit of current anomaly in the conventional example is shared during the sleep time and the wake time, a range of the current accuracy required at the time of detection becomes wider and the circuit structure becomes complex and the cost is increased.

The present application was made in view of the above problems, and aims to provide a power supply control system which can enhance detection accuracy of the dark current change with a relatively simple circuit structure, and which can detect anomaly of an ECU that does not have a communication function.

In order to achieve the above purpose, a power supply control system according to an aspect of the present application includes: a predetermined number of controllers which can transition between an operating state in which operations performed by a plurality of electronicses are respectively controlled and a power-saving state in which control of the electronicses is suspended according to a predetermined condition; a monitoring controller for respectively monitoring and controlling current supplied to each of the controllers; a first detector which detects current that flows in each of the controllers in the operating state of each of the controllers; a first current controller which, by controlling of the monitoring controller, supplies a driving current to each of the controllers in the operating state of each of the controllers, and when current that exceeds a predetermined threshold value is detected at the first detector, disconnects the driving current supply to each of the controllers; a second current controller which, by controlling of the monitoring controller, supplies a dark current to each of the controllers by being switched from the first current controller in the power-saving state of each of the controllers, and disconnects the dark current supply to each of the controllers in the operating state of each of the controllers; a second detector which detects a voltage drop amount based on change of the dark current in the power-saving state of each of the controllers; and an anomaly determinator which determines existence of anomaly in the power-saving state of the controllers based on whether or not a predetermined voltage drop amount has been detected by the second detector.

The power supply control system may be made such that when it is determined by the anomaly determinator that anomaly exists in the power-saving state of the controller, the monitoring controller may control to perform initialization to return each of the controllers to an ordinary state.

The first detector may include current sensors each of which is provided for each switch that constitutes the first current controller and each of which inputs a detection output to a CPU that constitutes the monitoring controller; and the second detector may include a dark current sensor which is connected between all of the controllers and an input side of the CPU that constitutes the monitoring controller via backflow prevention diodes, and a sense resistor which is connected between an output side of the CPU that constitutes the monitoring controller and the backflow prevention diodes via a bypass switch that constitutes the second current controller.

According to the aspect of the present application, it is possible to provide a power supply control system which can enhance detection accuracy of the dark current with a relatively simple circuit structure and which can detect anomaly of an ECU that does not have a communication function.

DESCRIPTION OF EMBODIMENTS

By referring to FIGS. 1 to 4, a power supply control system 1 according to an embodiment will be explained.
(Functional Structure of Power Supply Control System)

Figure 1:
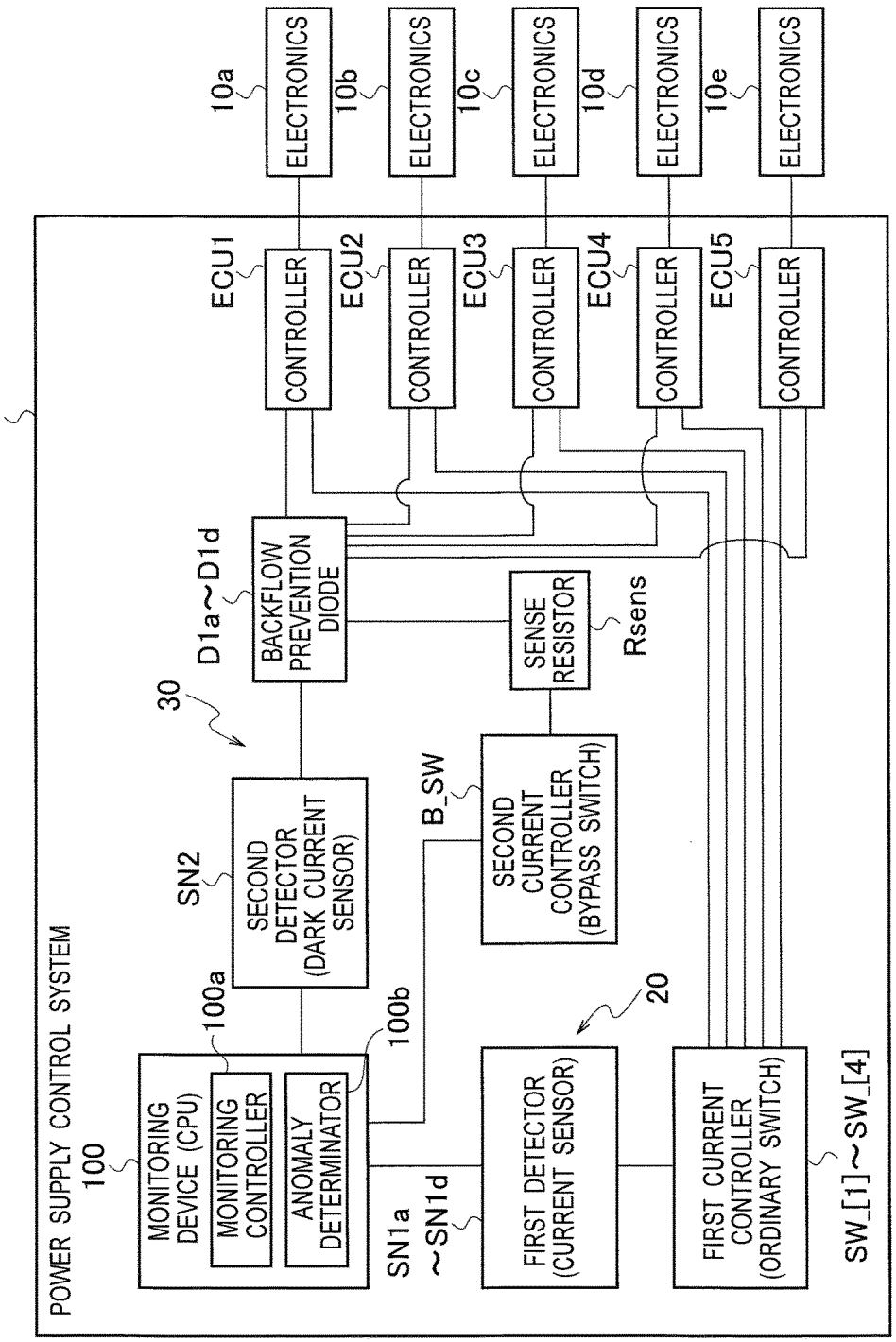
FIG. 1 is a functional block diagram illustrating a functional structure of a power supply control system according to an embodiment.

FIG. 1 is a functional block diagram illustrating a functional structure of the power supply control system 1 according to the embodiment.

The power supply control system 1 according to the embodiment includes, for example, a predetermined number of controllers ECU1 to ECU5 which can transfer between an operating state (also called a wake state) in which operations performed by a plurality of electronicses 10a to 10e such as an on-vehicle clock, a security system, or the like are respectively controlled and a power-saving state (also called a sleep state) in which the control is suspended, and a monitoring device 1 (composed of a CPU, a logic IC, or the like) for respectively monitoring the current supplied to each of the controllers ECU1 to ECU5.

In addition, while five electronicses 10a to 10e are provided in the example as illustrated in FIG. 1, there is no limit in the number of the electronicses.

The monitoring device 1 serves both as a monitoring controller 100a for respectively monitoring and controlling the current supplied to each of the controllers ECU1 to ECU5, and as an anomaly determinator 100b for determining existence of anomaly in the power-saving state of the controllers ECU1 to ECU5.

The power supply control system 1 includes current sensors SN1a to SNd as a first detector, ordinary switches SW_[1] to SW_[4] as a first current controller, a bypass switch B_SW as a second current controller, and the anomaly determinator 100b. The current sensors SN1a to SN1d detect current that flows in each of the controllers ECU1 to ECU5 in the operating state of each of the controllers ECU1 to ECU5. By control of the monitoring controller 100a, the ordinary switches SW_[1] to SW_[4] supply a driving current to each of the controllers ECU1 to ECU5 in the operating state of each of the controllers ECU1 to ECU5, and when the current that exceeds a predetermined threshold value is detected at the current sensors SN1a to SN1d, disconnect the driving current supply to each of the controllers ECU1 to ECU5. The ordinary switches SW_[1] to SW_[4] are composed of relays, FETs, or the like. The bypass switch B_SW supplies a dark current to each of the controllers ECU1 to ECU5 by control of the monitoring controller 100a in the power-saving state of each of the controllers ECU1 to ECU5 by being switched from the ordinary switches SW_[1] to SW_[4], and disconnects the dark current supply to each of the controllers ECU1 to ECU5 in the operating state of each of the controllers ECU1 to ECU5. The bypass switch B_SW is composed of a latch relay, semiconductor relay, or the like. The anomaly determinator 100b determines existence of anomaly in the power-saving state of the controllers ECU1 to ECU5 based on whether a predetermined voltage drop amount has been detected by a second detector 30 which detects the voltage drop amount based on dark current change in the power-saving state of each of the controllers ECU1 to ECU5.

The second detector 30 includes a dark current sensor SN2 and a sense resistor Rsens. The dark current sensor SN2 is connected between all of the controllers ECU1 to ECU5 and an input side of the monitoring device 100 (AD (i.e., A-D conversion input terminal), see FIG. 2) via backflow prevention diodes D1a to D1d. The sense resistor Rsens is connected between an output side of the monitoring device 100 (OUT (i.e., output terminal), see FIG. 2) and the backflow prevention diodes D1a to D1d via the bypass switch B_SW.

When the predetermined voltage drop amount has been detected by the second detector 30, the monitoring device 100 controls to perform initialization (i.e., power-on reset) which returns each of the controllers ECU1 to ECU5 to a ordinary state.

Thus, for example, in a case that the power supply control system 1 according to the embodiment is mounted on a vehicle, when the vehicle system is in an off-state, the ordinary switches SW_[1] to SW_[4 ] are turned off, and the bypass switch B_SW is turned on, and the current in the power-saving state (i.e. the dark current) can be supplied to each of the controllers ECU1 to ECU5.

Moreover, the voltage drop at the sense resistor Rsens (VB-Vsens, see FIG. 2) is monitored by the monitoring device 100, and in a case that anomaly is detected, each of the controllers ECU1 to ECU5 can be forcibly power-on reset according to a predetermined procedure (a detailed processing procedure thereof will be described later).

Thus, by regularly confirming a current value of the dark current, it is possible to detect one that could not go into the power-saving state (i.e., the sleep state) due to anomaly caused in any one of the controllers ECU1 to ECU5 by the dark current change.

Further, since the dark current in the power-saving state is smaller than an ordinary current in the operating state, when attempting to detect change by an ordinary current sensor (such as the current sensors SN1a to SN1d) as in the conventional example, there is a disadvantage that the sensor circuit becomes complex. Also, there is a problem that when a current sensor is operated in each circuit in order to detect change of the dark current in each circuit, current consumption of the detection circuit becomes large. Thus, in the embodiment, it is switched to a dedicated dark current detection circuit as the second detector 30 at a predetermined timing so that increase of the dark current can be detected with low current consumption.

Figure 5:
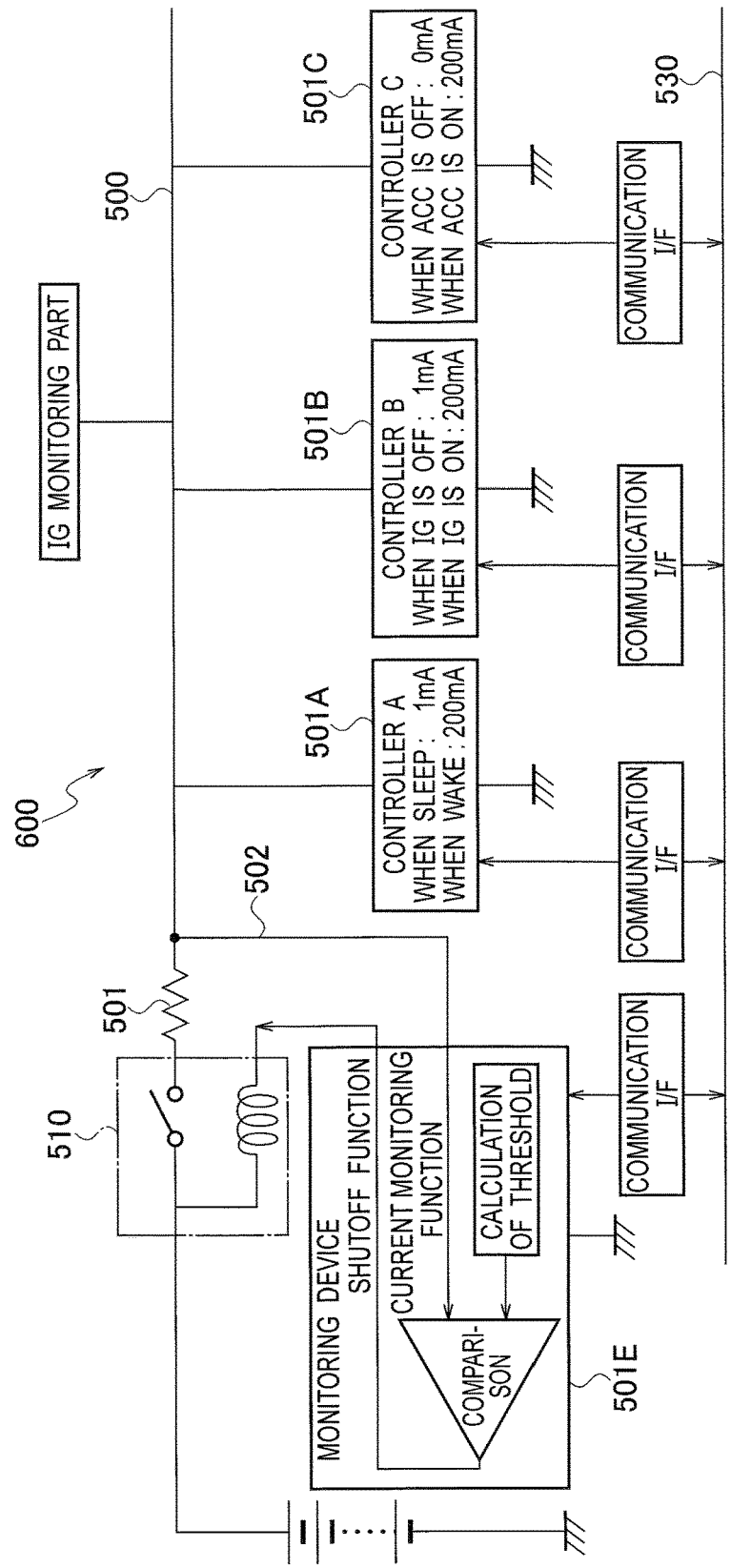
FIG. 5 is a circuit diagram illustrating an example of a circuit structure of a power supply control system according to a conventional example.

Thus, as compared to the conventional example such as illustrated in FIG. 5, it is possible to secure accuracy of dark current detection with a relatively simple-structured inexpensive circuit, and since it is not necessary to confirm the threshold value by communication, anomaly of an ECU that does not have a communication function can be detected also.

Moreover, since only the portion that the anomaly has occurred (i.e., the controllers ECU1 to ECU5) can be initialized (for example, power on/off), it is possible to return (power-on reset) the anomaly portion to the ordinary state while reducing influence of the anomaly to the whole system.

(Regarding Circuit Structure of Power Supply Control System)

By referring to FIG. 2, an example of a circuit structure of the power supply control system 1 according to the embodiment will be explained.

Figure 2:
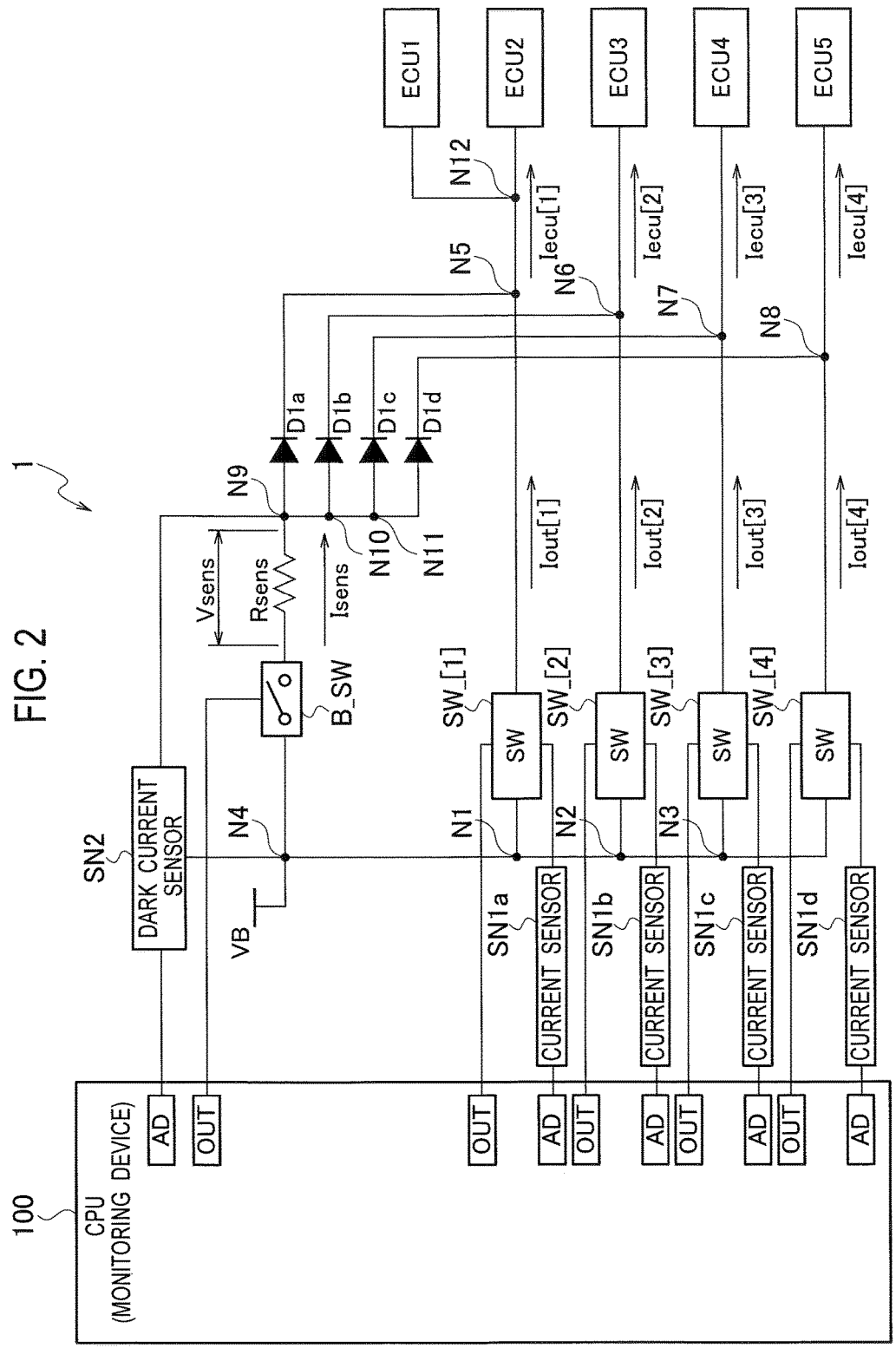
FIG. 2 is a circuit diagram illustrating an example of a circuit structure of the power supply control system according to the embodiment.

As illustrated in FIG. 2, the current sensors SN1a to SN1d as the first detector for detecting the current that flows in each of the controllers ECU1 to ECU5 are connected to input terminals (AD) of the monitoring device 100 that is composed of a CPU, logic IC, or the like.

Control terminals of the ordinary switches SW_[1] to SW_[4] as the first current controller are connected to output terminals (OUT) of the monitoring device 100. The ordinary switches SW_[1] to SW_[4] are turned on to supply the driving current to each of the controllers ECU1 to ECU5 in the operating state of each of the controllers ECU1 to ECU5, and are turned off to disconnect the driving current supply to each of the controllers ECU1 to ECU5 based on a detection result of the current sensors SN1a to SN1d by control of the monitoring device 100.

Input side terminals of the ordinary switches SW_[1] to SW_[4] are connected to a battery voltage (VB) via nodes N1 to N4.

The other terminals of the current sensors SN1a to SN1d are connected to respective corresponding ordinary switches SW_[1] to SW_[4].

Output side terminals of the ordinary switches SW_[1] to SW_[4] are connected to the controllers ECU1 to ECU5, and supply the driving current (i.e., the current that flows in the ordinary switches SW_[1] to SW_[4]) Iout[1] to Iout[4] to the controllers ECU1 to ECU5 in an on-state.

Further, for example, in a case that power supply lines are put together via a node N12 or the like such as like the controllers ECU1 and ECU2 as illustrated in FIG. 2, it is made such that the controllers that have the same conditions for the operating state and the power-saving state (i.e., the conditions of sleep/wakeup) are put together.

The bypass switch B_SW as the second current controller is connected to another output terminal (OUT) of the monitoring device 100. The bypass switch B_SW is turned on to supply a dark current to each of the controllers ECU1 to ECU5 in the power-saving state of each of the controllers ECU1 to ECU5, and is turned off to disconnect the dark current supply to each of the controllers ECU1 to ECU5 in the operating state of each of the controllers ECU1 to ECU5 by control of the monitoring device 100.

One end of the bypass switch B_SW is connected to the battery voltage (VB) via a node N4, and the other end is connected to the sense resistor Rsens.

The dark current sensor SN2 is connected between the controllers ECU1 to ECU5 and another input terminal (AD) of the monitoring device 100 via nodes N9 to N11 and the backflow prevention diodes D1a to D1d.

The anode terminals of the backflow prevention diodes D1a to D1d are connected to the sense resistor Rsens and the dark current sensor SN2 via the nodes N9 to N11. One terminal of the dark current sensor SN2 is connected to one end of the bypass switch B_SW and the ordinary switches SW_[1] to SW_[4] via the node N4.

The cathode terminals of the backflow prevention diodes D1a to D1d are connected to the controllers ECU1 to ECU5 via nodes N5 to N8, and supply the dark current Iecu[1] to Iecu[4] to the controllers ECU1 to ECU5 in an on-state of the bypass switch B_SW (that is, in the power-saving state of the controllers ECU1 to ECU5).

(Power Supply Control Processing)

Figure 3:
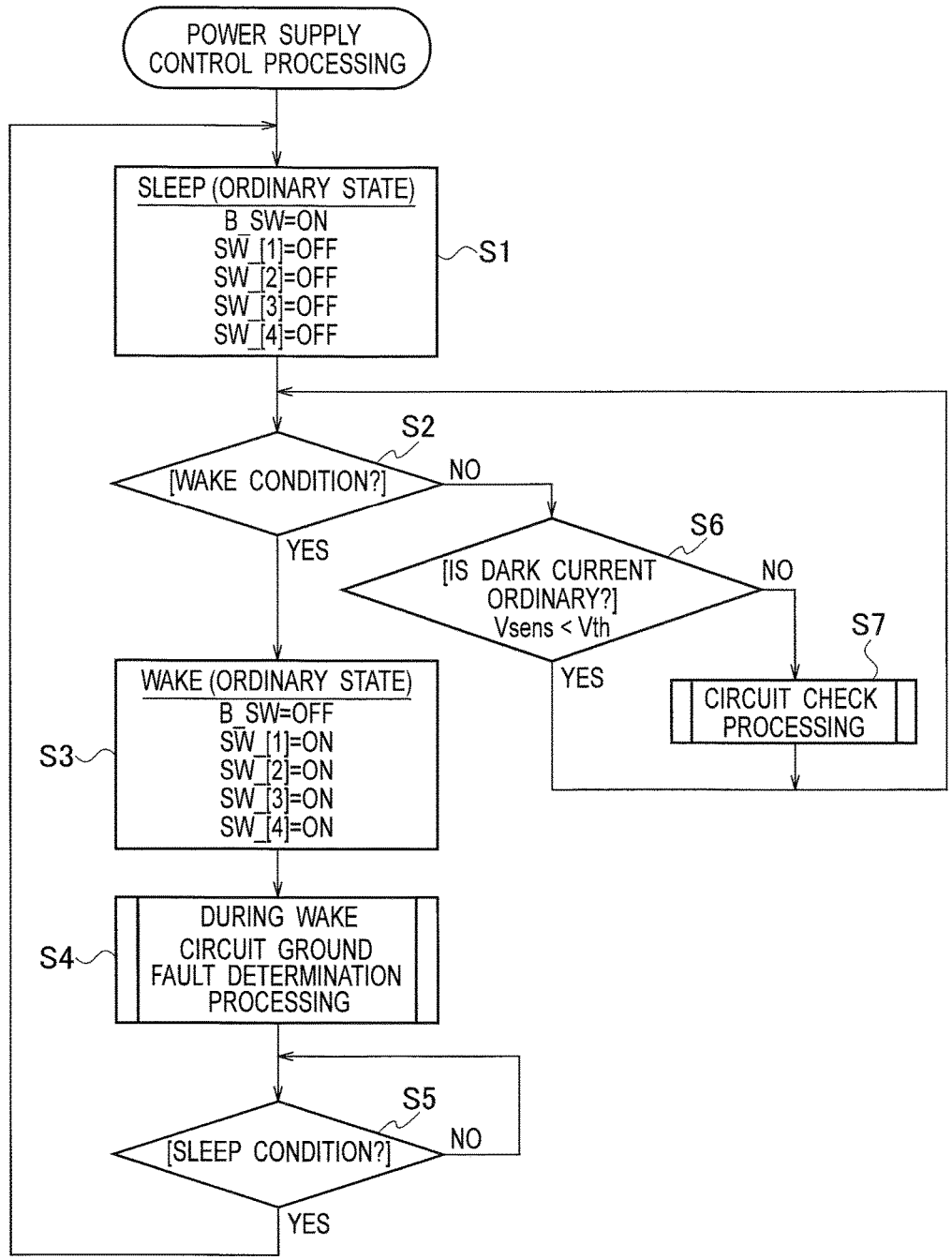
FIG. 3 is a flowchart illustrating an example of a processing procedure of power supply control processing in the power supply control system according to the embodiment.

By referring to the flowchart as illustrated in FIG. 3, an example of a processing procedure of the power supply control processing performed in the power supply control system 1 according to the embodiment will be explained.

First, at step S1, in the power-saving state (i.e., in the ordinary state of sleep) of the controllers ECU1 to ECU5, the bypass switch B_SW is turned on, and the ordinary switches SW_[1] to SW_[4] are turned off, and the process moves to step S2. Thus, the dark current Iecu[1] to Iecu[4] is supplied to the controllers ECU1 to ECU5 via the bypass switch B_SW.

At step S2, it is determined whether or not the controllers ECU1 to ECU5 meet an operating condition (wake condition). Further, details of the wake condition are omitted.

Moreover, in a case that the result of determination at step S2 is "Yes", the process moves to step S3.

At step S3, in the operating state (i.e., in the ordinary state of wake) of the controllers ECU1 to ECU5, the bypass switch B_SW is turned off, and the ordinary switches SW_[1] to SW_[4] are turned on, and the process moves to step S4. Thus, the driving current Iout[1] to Iout[4] is supplied to the controllers ECU1 to ECU5 via the ordinary switches SW_[1] to SW_[4].

At step S4, a subroutine of circuit ground fault determination processing during the operating state (i.e., during wake) is performed and the process moves to step S5. Further, details of the circuit ground fault determination processing are omitted.

At step S5, it is determined whether or not a power-saving condition (sleep condition) is met, and in a case that it is "No", the process waits, and in a case that it is "Yes", the process returns to step S1. Further, details of the sleep condition are omitted.

Moreover, in a case that it is determined as "No" at step S2, the process moves to step S6.

At step S6, it is determined whether the dark current detected at the dark current sensor SN2 is ordinary, that is, when a bypass sensor voltage by the sense resistor Rsens is Vsens, and a dark current threshold value is Vth, it is determined whether or not it is Vsens<Vth.

Moreover, the bypass sensor voltage Vsens is calculated by a bypass current (Isens) multiplied by a resistance of the sense resistor Rsens.

Then, in a case that the determination result at step S6 is "Yes", the process returns to step S2, and in a case that it is "No", the process moves to step S7.

At step S7, after a subroutine of circuit check processing is performed, the process returns to step S2.

Next, by referring to the flowchart of FIG. 4, a processing procedure of the circuit check processing will be explained.

Figure 4:
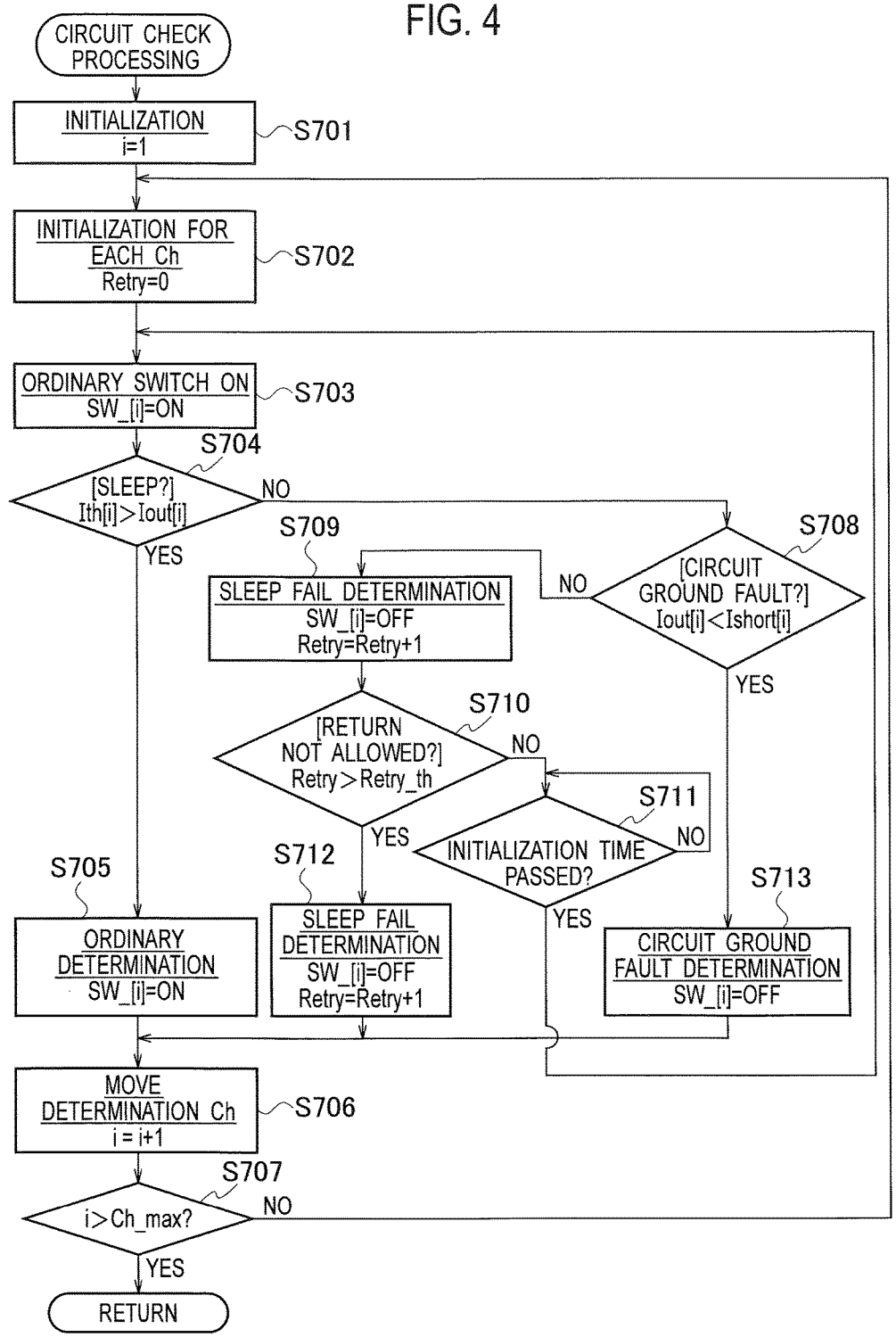
FIG. 4 is a flowchart illustrating an example of a subroutine concerning circuit check processing in the power supply control system according to the embodiment.

Also, in the flowchart of FIG. 4, the character "Ch" represents the number of circuits for which the determination is performed (in the circuit diagram as illustrated in FIG. 2, the four circuits in which the dark current Iecu[1] to Iecu[4] flows); "i" represents a determination Ch number (i.e., the circuit for which the determination is performed); "Retry" is the number of times of retry; "Retry_th" is the maximum number of times of retry (which is set in accordance with the system); "Ch_max" is the maximum number of circuits for which the determination is performed (in the example as illustrated in FIG. 2, it is "4"); "Vth" is a dark current threshold value (i.e., the maximum value of the dark current of the whole ECUs plus a margin); "Ith[*]" is a dark current threshold value per Ch (i.e., the maximum value of the dark current of a corresponding circuit plus a margin); "Ishort[*]" is a ground fault determination threshold value per Ch (i.e., the threshold value for determining ground fault); and "SW_[*]" is a state of the ordinary switch (that is, the state of on or off) respectively.

In FIG. 4, at step S701, initialization of circuit check processing is performed, and by making i=1, the process moves to step S702.

At step S702, initialization per Ch (for each circuit) is performed, and by making Retry=0, the process moves to step S703.

At step S703, the ordinary switch is turned on (in the example of FIG. 2, it is turned on in the Order of the ordinary switch SW_[1]->SW_[2]->SW_[3]->SW[4]) and the process moves to step S704.

At step S704, it is determined whether or not the controller ECU is in the power-saving state (i.e. in the sleep state) (that is, whether or not Ith[i] >Iout[i]) (in the example of FIG. 2, it is determined in the order of ECU1->ECU2->ECU3->ECU4).

Then, in a case that the determination result at step S704 is "Yes", the process moves to step S705.

At step S705, it is determined that the controller ECU is ordinary, and the ordinary switch SW_[1] is turned on (in the example of FIG. 2, it is turned on in the order of the ordinary switch SW_[1]->SW_[2]->SW_[3]->SW[4]), and the process moves to step S706.

At step S706, "i" is incremented by "1", and the determination Ch (the circuit for determination) is moved, and the process moves to step S707.

At step S707, it is determined whether or not it is i >Ch_max (in the example of FIG. 2, whether or not it has reached the number of the circuits "4"), and in a case that it is "Yes", the process returns to the main processing of FIG. 3, and in a case that it is "No", the process returns to step S702.

Further, in a case that it is determined as "No" at step S704, the process moves to step S708.

At step S708, it is determined whether or not the circuit is ground faulted, that is, whether or not Iout[i]<Ishort[i].

Then, in a case that the determination result at step S708 is "Yes", the process moves to step S713 to determine that the ground fault is occurred, and the ordinary switch SW_[i] SW_[1] to SW_[4]) is turned off, and the process moves to step S706.

Further, in a case that the determination result at step S708 is "No", the process moves to step S709.

At step S709, it is determined that the controller ECU has failed to transition to the power-saving state (i.e., the sleep state), and the ordinary switch SW_[i] (SW_[1] to SW_[4]) is turned off, and after the number of retry Retry is incremented by "1", the process moves to step S710.

At step S710, it is determined whether or not return of the controller ECU is possible, that is, whether or not it is Retry>Retry_th.

Then, in a case that the determination result at step S710 is "No", that is, in a case that it is possible to return, the process moves to step S711 and initialization (i.e., power-on reset) is performed and it is determined whether or not the time for initialization has passed. In a case that the determination result is "No", the initialization processing is continued, and in a case that it is "Yes", the process returns to step S703.

On the other hand, in a case that the determination result at step S710 is "Yes", the process moves to step S712 to determine that the controller ECU has failed to transition to the power-saving state (i.e. the sleep state), and the ordinary switch SW_[i] (SW_[1] to SW_[4]) is turned off, and after the number of retry Retry is incremented by "1", the process moves to step S706.

By the above processing, in a case that anomaly of the controller ECU1 to ECU5 has been detected, it is possible to forcibly power-on reset each controller ECU1 to ECU5.

Moreover, it is possible to initialize (power-on reset) only the part that anomaly has occurred (the controller ECU1 to ECU5), and it is possible to return the anomaly part to the ordinary state while restraining influence of the anomaly to the whole system.

The power supply control system according to the embodiment has been explained by referring to the drawings above, but the present application is not limited to this, and the structure of each part can be replaced by an arbitrary structure having a similar function.

What is claimed is:

1. A power supply control system, comprising:
a predetermined number of controllers capable of transferring between an operating state in which operations performed by a plurality of electronicses are respectively controlled and a power-saving state in which control of the electronicses is suspended according to a predetermined condition;
a processor configured to perform operations comprising operation as a monitoring controller that respectively monitors and controls current supplied to each of the controllers;
a first detector detecting current that flows in each of the controllers in the operating state;
a first current controller controlled by the monitoring controller to supply a driving current to each of the controllers in the operating state, and in response to the detected current that flows in each of the controllers in the operating state exceeding a predetermined threshold value, disconnecting the driving current supplied to each of the controllers;
a second current controller controlled by the monitoring controller to supply a dark current to each of the controllers by switching the dark current from the first current controller to each of the controllers in the power-saving state, and disconnecting the dark current supplied to each of the controllers in the operating state; and a second detector detecting a voltage drop of the controllers amount based on a change of the dark current in each of the controllers in the power-saving state, wherein the processor is configured to perform operations comprising operation as an anomaly determinator that determines an existence of an anomaly in the power-saving state of the controllers based on whether a predetermined voltage drop amount of the voltage drop has been detected by the second detector.

2. The power supply control system according to claim 1, wherein in response to the processor performing operations comprising operation as the anomaly determinator determining the anomaly exists in the power-saving state of the controllers, the processor performs operations comprising operation as the monitoring controller to control the controllers to perform an initialization to return each of the controllers to an ordinary state.

3. The power supply control system according to claim 1, wherein:

the first detector comprises one or more current sensors each of which is provided for each switch that comprises the first current controller, and each of which inputs a detection output to the processor configured to perform operations comprising the operation as the monitoring controller; and the second detector comprises a dark current sensor connected between all of the controllers and an input side of the processor configured to perform operations comprising the operation as the monitoring controller via backflow prevention diodes, and a sense resistor connected between an output side of the processor configured to perform operations comprising the operation as the monitoring controller and the backflow prevention diodes via a bypass switch that comprises the second current controller.

\* \* \* \* \*